United States Patent
Di Censo et al.

(10) Patent No.: US 9,811,991 B2
(45) Date of Patent: Nov. 7, 2017

(54) DO-NOT-DISTURB SYSTEM AND APPARATUS

(71) Applicant: HARMAN INTERNATIONAL INDUSTRIES, INC., Stamford, CT (US)

(72) Inventors: Davide Di Censo, San Mateo, CA (US); Stefan Marti, Oakland, CA (US); Ajay Juneja, Mountain View, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 89 days.

(21) Appl. No.: 14/318,120

(22) Filed: Jun. 27, 2014

(65) Prior Publication Data

US 2015/0379842 A1    Dec. 31, 2015

(51) Int. Cl.
| G08B 13/00 | (2006.01) |
| G08B 13/24 | (2006.01) |
| G06F 3/01 | (2006.01) |
| H04R 5/033 | (2006.01) |
| H04S 7/00 | (2006.01) |
| G06K 9/00 | (2006.01) |

(52) U.S. Cl.
CPC ......... *G08B 13/2491* (2013.01); *G06F 3/013* (2013.01); *H04R 5/033* (2013.01); *H04S 7/304* (2013.01); *G06K 9/00604* (2013.01); *H04R 2201/34* (2013.01); *H04R 2400/01* (2013.01)

(58) Field of Classification Search
None
See application file for complete search history.

(56) References Cited

U.S. PATENT DOCUMENTS

| 5,657,380 | A  | * | 8/1997 | Mozer | H04M 1/0291 340/565 |
| 6,236,969 | B1 | * | 5/2001 | Ruppert | H04M 1/05 704/270 |
| 7,378,982 | B2 |   | 5/2008 | Mohamed | |
| 7,382,982 | B2 | * | 6/2008 | Lee | H04J 14/0226 398/100 |

(Continued)

OTHER PUBLICATIONS

Basu, Sumit et al., Smart Headphones, Proceedings of the ACM CHI 2001 Human Factors in Computing Systems Conference, 2001, MIT, Cambridge, United States.

(Continued)

*Primary Examiner* — Brian Zimmerman
*Assistant Examiner* — Thomas McCormack
(74) *Attorney, Agent, or Firm* — Artegis Law Group, LLP

(57) ABSTRACT

A product for detecting people approaching an isolated user, discouraging the detected people from disturbing the user, and for taking messages from the approaching people. The product may be embodied in noise-canceling headphones that the user is wearing, for example. The product can include a camera and a microphone that can detect approaching people. The product can also include an externally-facing speaker that can play an audio message to the approaching person to attempt to discourage the person from disturbing the user. The product can also prompt the person to leave a message for the user and then record the subsequent message. The user can review the message at a later time.

16 Claims, 8 Drawing Sheets

(56) References Cited

U.S. PATENT DOCUMENTS

| | | |
|---|---|---|
| 8,838,481 B2 * | 9/2014 | Moshfeghi .............. G01S 19/48 235/380 |
| 2002/0125993 A1 * | 9/2002 | Gutta ................... G06Q 10/107 340/5.52 |
| 2005/0207543 A1 | 9/2005 | Takeda et al. |
| 2007/0103542 A1 * | 5/2007 | Carter ................... H04N 7/142 348/14.06 |
| 2008/0118081 A1 | 5/2008 | Chang |
| 2010/0118141 A1 * | 5/2010 | Bouchon-Meunier . H04N 5/232 348/135 |
| 2013/0288753 A1 | 10/2013 | Jacobsen et al. |
| 2014/0362201 A1 | 12/2014 | Nguyen |

OTHER PUBLICATIONS

Mueller, F. et al., Transparent Hearing, Extended Abstracts on Human Factors in Computing Systems, 2002, ACM, New York, United States.
Extended European Search Report Application No. 15173230.2 dated Jan. 15, 2016, 3 pages.

* cited by examiner

DO-NOT-DISTURB SYSTEM AND APPARATUS

BACKGROUND

Often times, people wear noise-canceling or noise-attenuating headphones in busy and/or noisy environments such as offices, coffee shops, and libraries so that they can work without distraction. The headphones can be, for example, in-ear headphones (e.g., ear buds), on-ear headphones, or over-the-ear head phones. In many instances, the headphones provide a certain degree of passive noise attenuation by covering the wearer's ear canal. In addition, some headphones can provide active noise canceling by generating sound waves that are opposite to detected sound waves impinging on the headphones.

In some circumstances, people do not need noise-canceling headphones to work without distraction. For example, some people have private office spaces and can close a door to block or attenuate outside noises.

While noise-canceling or noise-attenuating devices, such as those described above, may remove distracting noises or conversations from a user's immediate environment, such devices do not prevent other people from disturbing the user, e.g., approaching the user to engage in conversation.

SUMMARY

Embodiments of the present invention can detect people approaching a user who does not wish to be disturbed and attempt to dissuade the people from interrupting the user. Furthermore, embodiments of the present invention can enable the people to leave messages for the user, which the user can review at a later time.

According to various embodiments, a system can include a detector configured to detect a person approaching a user who wants to not be disturbed. The system can include an indicator that can inform the approaching person that the user does not want to be disturbed and prompt the approaching person to leave a message. The system can include memory to record the message left by the approaching person.

According to various other embodiments, a pair of headphones can include a housing and acoustic-transducers for generating sound waves in the ears of a subject wearer. A first detector arranged in the housing can detect a person approaching the wearer. An indicator arranged in the housing can inform the approaching person that the wearer does not want to be disturbed and query whether the approaching person wants to leave a message. A second detector can be arranged in the housing to detect the message from the approaching person. The housing can also include a memory module that records the detected message.

According to various other embodiments, a computer program product can include a computer-readable storage medium with computer-readable program code therein. The program code can be configured to detect a person approaching a subject person, determine whether the approaching person likely intends to disturb the subject person, and, if so, provide an indication to the approaching person that the subject person does not want to be disturbed. The program code can also be configured to record a message from the approaching person and to provide an indication to the subject person that a message has been recorded.

Figure 1A:
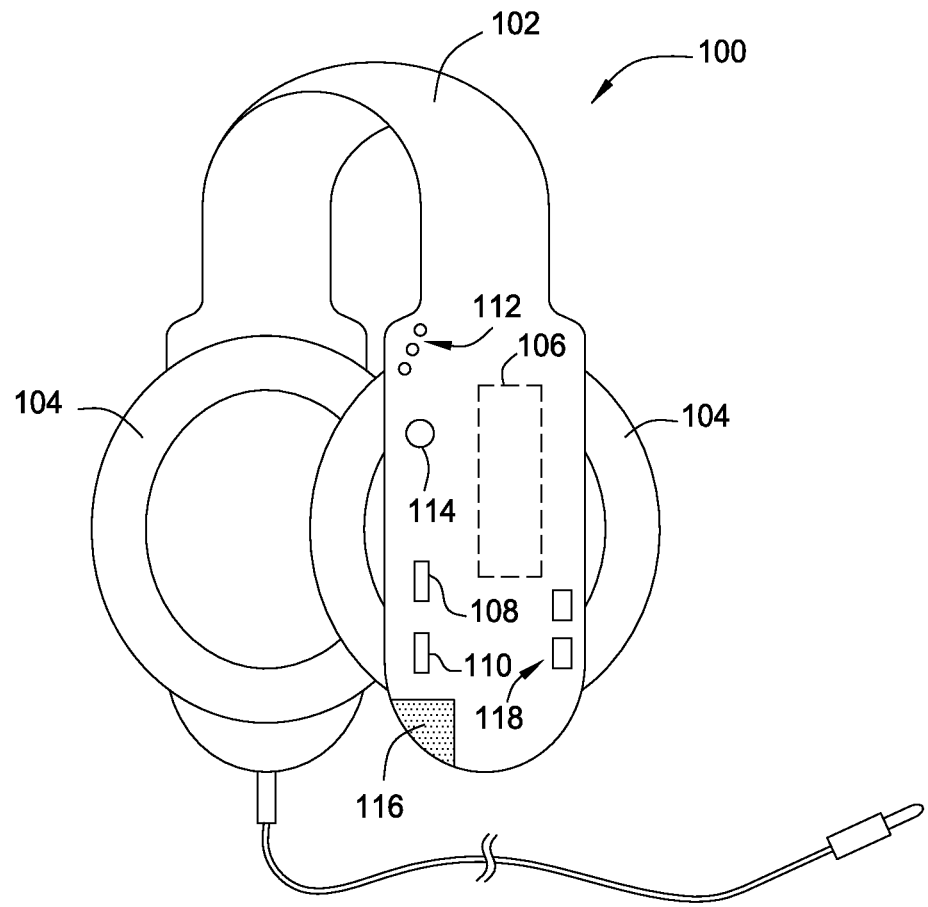
FIG. 1A is a perspective rear view of an embodiment of headphones that includes a system for discouraging an approaching person from disturbing a wearer of the headphones and for enabling the approaching person to leave a message for the wearer.
Figure 1B:
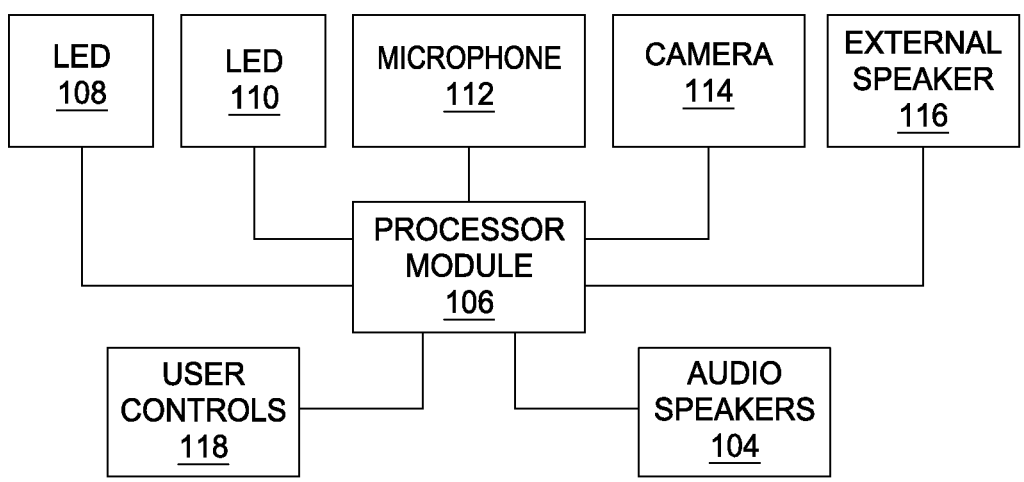
FIG. 1B is a block diagram of components of the system of FIG. 1A.
Figure 1C:
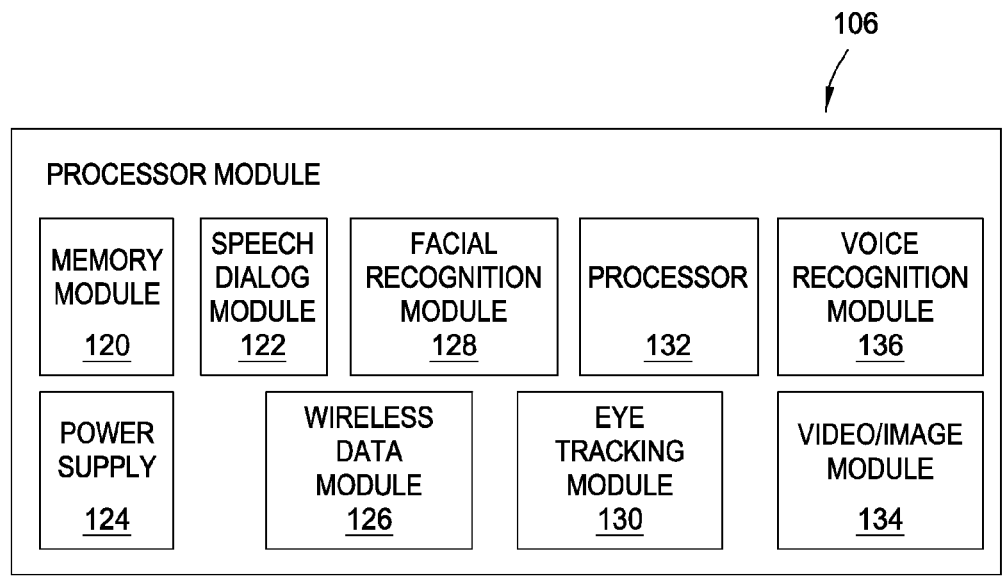
FIG. 1C is a block diagram of the processor module of the system of FIG. 1A.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

FIGS. 1A, 1B, 1C, and 5 illustrate an embodiment of noise-attenuating and/or noise-cancelling headphones 100 that incorporate a system for detecting a person 510 approaching a wearer 502 and attempting to discourage the person 510 from disturbing the wearer 502 of the headphones 100. The headphones 100 can include a housing 102 and ear cups 104. The housing 102 can also include components for detecting the approaching person 510 and attempting to discourage the person 510 from disturbing the wearer 502. The system can include a processor module 106 that includes a processor 132, a memory module 120, and a power supply 124 (e.g., a battery). The processor module 106 can be in communication with light-emitting diodes (LEDs) 108 and 110, a microphone 112, a camera 114, a speaker 116, and/or user controls 118. In operation, the camera 114 and microphone 112 can detect images and sounds of the approaching person 510. For example, in various embodiments, the camera 114 can be rearward facing such that it can capture an image of the person 510 approaching the wearer 502 of the headphones 100 from behind. A video/image module 134 of the processor module 106 can process images captured by the camera 114 to determine a path of movement of the person 510. For example, if the camera 114 captures successive images of the person 510 in a relatively static position, then the video/image module 134 may determine that the person 510 is standing still and therefore not approaching the wearer 502 of the headphones 100. If the image of the person 510 is getting larger in successive captured images, then the video/image module 106 may determine that the person 510 is approaching the wearer 502 of the headphones 100.

Figures 8A, 8B:
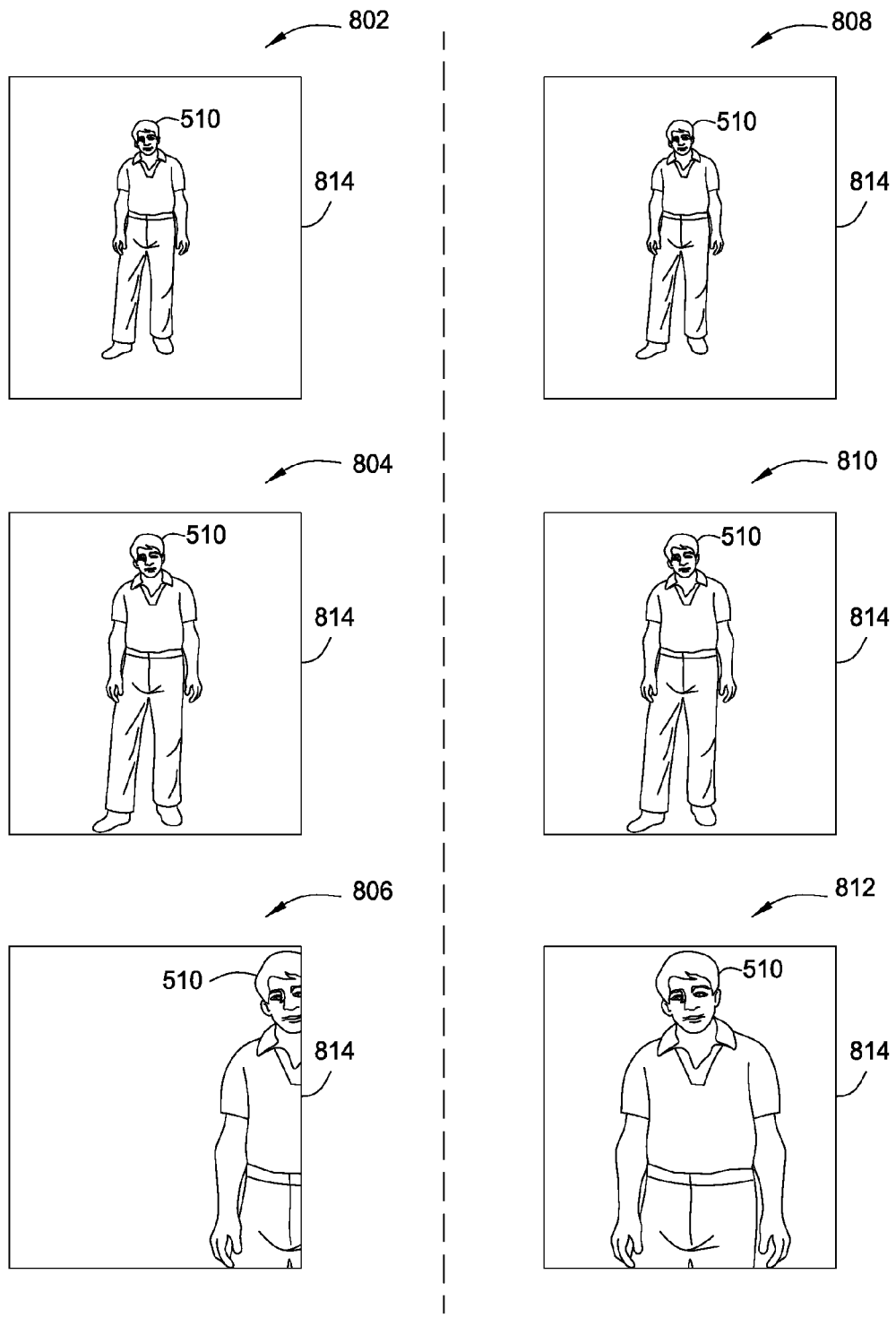
FIG. 8A illustrates three successive images captured by a camera of an embodiment of the system in which an approaching person is getting closer to a user but moving in a direction such that the person will pass by the user.
FIG. 8B illustrates three successive images captured by the camera of FIG. 8A in which the approaching person is getting closer and heading directly toward the user.

In various embodiments, the video/image module 134 can calculate a direction of movement of the person 510 based on the change of size of the person 510 in successive images (e.g., the person 510 is getting closer if the person 510 is getting larger in successive images or is getting further away if the person 510 is getting smaller in successive images) and lateral motion of the person 510 in successive images. For example, FIG. 8A shows three successive images 802, 804, and 806 captured by an embodiment of a camera 114. In the first image 802, the person 510 in the image is relatively small. In the subsequent image 804, the person 510 is larger than in image 802. In the last image 806, the person 510 is larger than in image 804 or image 802. Thus, the person 510 is moving toward the camera 114 and the user. However, the image of the person 510 is also moving laterally with respect to the frame 814 of the successive images 802, 804, and 806. For example, in image 802, the person 510 is relatively centered in the frame 814. In the next image 804, the person 510 is closer to a right boundary of the frame 814. In the last image 806, the person 510 is even closer to the right boundary of the frame 814. From the successive images 802, 804, and 806, the video/image module 134 may determine that the person is getting closer to the wearer 502, but is moving in a direction in which the person 510 will pass by the wearer 502. By contrast, FIG. 8B shows three successive images 808, 810, and 812 in which an image of the person 510 gets larger in each subsequent image and also stays relatively stationary relative to the frame 814 of the images. In such circumstances, the video/image module may determine that the person 510 is moving directly toward the wearer 502.

In certain embodiments, the camera 114 can capture additional details about the approaching person 510 to determine whether the person 510 is approaching the wearer 502. For example, the camera 114 may capture images of the direction of the person's 510 eye gaze to distinguish between someone approaching the wearer and someone merely passing by the wearer. For example, the processor module 106 can include an eye tracking module 130 that determines the direction of the approaching person's 510 eye gaze. The processor module 106 may determine that a person 510 who is getting closer to the wearer 502 and looking at the wearer 502 is approaching the wearer 502 to interact with and thereby disturb the wearer 502. By contrast, the processor module 106 may determine that a person 510 who is approaching the wearer 502 but is looking in a different direction (e.g., looking in their walking direction) is not approaching the wearer 502 with the intent to interact with and thereby disturb the wearer 502. In certain embodiments, the processor module 106 can include a facial recognition module 128 to identify the approaching person 510. For example, the processor module 106 can store facial information of acquaintances (e.g., friends, family members and colleagues) of the wearer 502 in a memory module 120. If the facial recognition module 128 detects an acquaintance approaching the wearer 502, the processor module 106 can assume that the acquaintance is approaching to interact with and thereby disturb the wearer 502. By contrast, an approaching person 510 who is not recognized by the facial recognition module 128 may be assumed to be a stranger who is likely not intending to interact with and thereby disturb the wearer 510.

The microphone 112 can also be used to detect an approaching person 510. For example, certain embodiments of the processor module 106 can include an acoustic analyzer (e.g., a voice recognition module 136) to identify voices of acquaintances of the wearer 502. The voice recognition module 136 may determine that a detected acquaintance 510 intends to interact with and thereby disturb the wearer 502. Similarly, if the voice recognition module 136 detects an unrecognized voice, then the voice recognition module 136 may determine that the person 510 does not intend to interact with and thereby disturb the wearer 502. Certain embodiments of the processor module 106 can also include a speech recognition module 122 to detect words or phrases spoken by the approaching person 510 that may indicate that the approaching person 510 intends to interact with and thereby disturb the wearer 502. For example, if the wearer's 502 name is John and the approaching person 510 says "Hi John" or "Can I ask you a question John?", then the voice recognition module 136 may determine that the person 510 intends to interact with and thereby disturb the wearer 502. Similarly, phrases such as "excuse me" or "pardon me" may be detected and determined to be attempts by a person 510 to interact with the wearer 502.

In the event the processor module 106 determines that an approaching person 510 intends to interact with and thereby disturb the wearer 502, the processor module 106 can illuminate one or more of the lights 108 and 110 and play a message through the external speaker 116 to attempt to discourage the interaction. For example, a first LED 108 may be illuminated in a red color. Red may be chosen because it generally indicates "stop" or "do not proceed." However, other colors may be used. When the wearer 502 puts the system in a "do-not-disturb" mode (discussed below), the first LED 108 can be illuminated red to serve as a general warning to approaching persons 510 that the wearer 502 does not want to be disturbed. Upon determining that an approaching person 510 likely wants to interact with and thereby disturb the wearer 502, the processor 106 can flash the first LED 108 on and off to draw the person's 510 attention to the "do-not-disturb" state of the system and the wearer's 502. Embodiments of the processor 106 can also issue an audible alert to the approaching person 510 through the external speaker 116. For example, in certain embodiments, the processor 106 could play a message 508 that states "John is busy right now and does not want to be disturbed. Would you care to leave a message?" If the processor module 106 recognizes the approaching person (e.g. using the facial recognition module 128 and/or the voice recognition module 136), then the message can include a personalized greeting. For example, if the processor module 106 recognizes the approaching person as the wearer's friend Bob, then the message can begin with "Hello Bob." After playing the message, the processor module 106 can listen (via the microphone 112) for the person 510 to indicate whether he wishes to leave a message. For example, the speech dialog module 122 can listen for the person 510 to say "yes" or "no." If the person 510 indicates that he wishes to leave a message, then the processor module 106 can store the message in the memory module 120 (e.g., flash memory). Embodiments of the processor module 106 can store the message as an audio file (e.g., an MP3 file) of the person's voice. In certain embodiments, the message can include both voice (recorded using the microphone 112) and video (recorded using the camera 114). Embodiments of the processor module 106 can also convert the person's spoken words into text (e.g., using the speech dialog module 122) and store the message as a text file.

In the above-described example in which the headphones play an audible alert to the approaching person 510, the noise-canceling or noise-attenuating headphones can mute or muffle the alert and any message that may be left by the person 510. Typically, noise-canceling headphones are most effective blocking constant or consistent noise sources (e.g., white noise or engine noise). Voices and spoken words are less-effectively blocked because the sound waves associated with voices are varying. In various embodiments, the processor module 106 can communicate information about the sound waves of the alert to be played through the external speaker 116 for the person 510 to control logic controlling the noise-cancellation such that the noise-cancelling head phone can more-effectively block the sounds of the alert. As a result, the alert and/or message may not be detected by the wearer 502.

As described above, in certain embodiments, the first LED 108 can be illuminated red (or another color) to indicate that the headphones wearer 502 does not want to be disturbed. In various embodiments, the first LED 108 (or a different LED) can be illuminated a different color, such as green, to indicate that the wearer 502 of the headphones 100 is willing to be interrupted. In certain embodiments, the color of the LED can depend on a mode of operation of the headphones. For example, the wearer 502 may use the user controls 118 to control a mode of operation of the headphones 100. In certain embodiments, a first mode may be an "off" mode in which the headphones 100 are not providing noise cancellation for the wearer 502. A second mode may be an "on" mode in which the headphones 502 provide noise cancellation for the wearer 502, but does not attempt to stop approaching people 510 from disturbing the wearer 502. In this second mode, the first LED 108 may be illuminated green, for example. A third mode may be an "on-do-not-disturb" mode in which the headphones 100 provide noise cancellation for the wearer 502 and attempts to stop approaching people 510 from disturbing the wearer 502. In this third mode, the first LED 110 may be illuminated red, for example. Alternatively, the first LED may be illuminated green when the system is in the second mode and, when the headphones 100 are put in the third mode, the first LED 110 may be extinguished and a different LED may be illuminated red.

In certain embodiments, after the message has been stored in the memory module 120, the processor module can provide a prompt to the wearer 502 that a message was left. For example, the headphones 100 can play a tone or a beep through the headphone audio speakers 104. In various other embodiments, the headphones 100 can provide an unobtrusive indicator to the wearer. For example, the second LED 110 on the housing 102 can be illuminated. When the wearer removes the headphones 100, the wearer 502 will see the illuminated LED 110 and know that a message has been recorded. In various embodiments, the processor module 106 can include a wireless data module 126 (e.g., a BLUETOOTH wireless communications module or a Wi-Fi module) that can transmit the prompt to a remote device. For example, a prompt can be sent as an e-mail to the wearer's computer. As another example, the prompt can be sent to the wearer's 502 smart phone as a text message. As yet another example, the prompt can be sent to another peripheral device, such as GOOGLE GLASS® eyewear. For example, if the wearer 502 is also wearing a pair of GOOGLE GLASS® eyewear, then an icon may be displayed in the wearer's 502 line of sight to indicate that a message is waiting.

If the message left for the wearer 502 is an audio file, then the wearer 502 can listen to the message through the headphone audio speakers 104. The wearer 502 can initiate playback using the user controls 118 on the housing 102 of the headphones 100. In some embodiments, the processor module 106 can use the wireless data module 126 to transmit the recorded message to a computer, smart phone, or the like. For example, an audio file, video file, and/or a text file containing the recorded message can be transmitted to the wearer's 502 computer 504, smart phone, or peripheral (e.g., GOOGLE GLASS® eyewear) for review and/or playback.

In addition to controlling an operational mode of a system and/or message playback, as discussed above, the user controls 118 can also control other aspects of embodiments of the system. For example, the user controls 118 can enable the wearer 502 to identify people 510 as acquaintances. For example, an approaching person 510 leaving a message for the first time may not be identified by the system as an acquaintance of the wearer 502 (as described above). Embodiments of the headphones 100 can include user controls 118 that enable the wearer 502 to identify the person 510 as an acquaintance. For example, after the wearer 502 reviews the person's 510 message, the user controls 118 may enable the wearer 502 to associate the person's 510 voice as an acquaintance. For simplicity, FIG. 1A illustrates two buttons. However, the headphones can include more or fewer buttons. In certain embodiments, the headphones may include a communications port (e.g., a USB port) for connection to a computer. The computer may be used to configure the operation of the processor module 106.

Figure 2A:
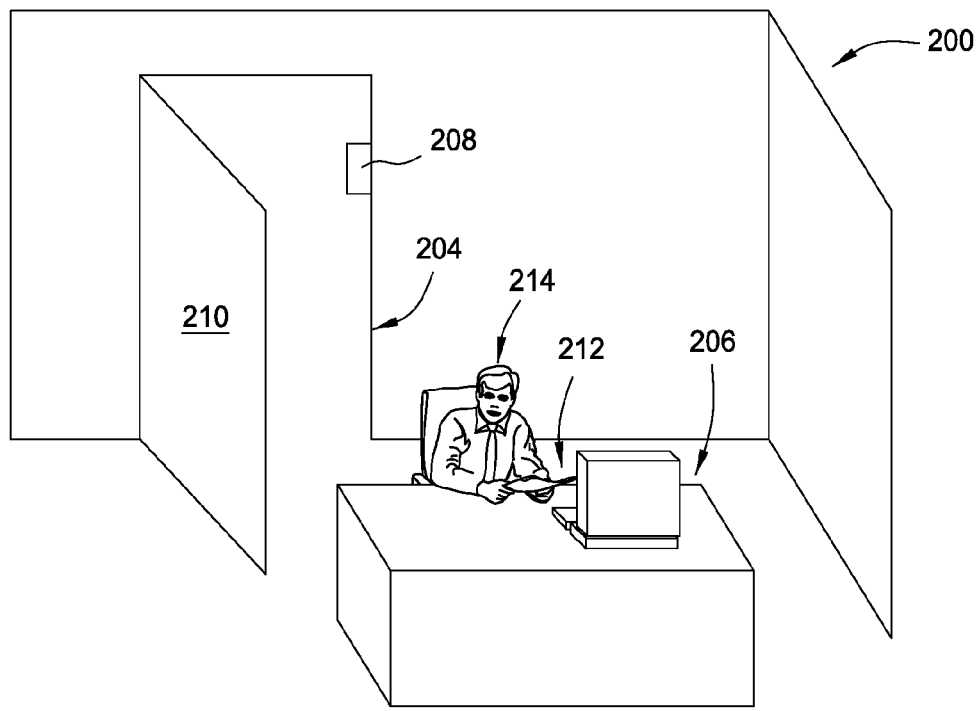
FIG. 2A is a perspective view of an office with a door, wherein an embodiment of a apparatus for discouraging an approaching person from interrupting a wearer of the headphones and for enabling the approaching person to leave a message for the office occupant is arranged in the doorway.
Figure 2B:
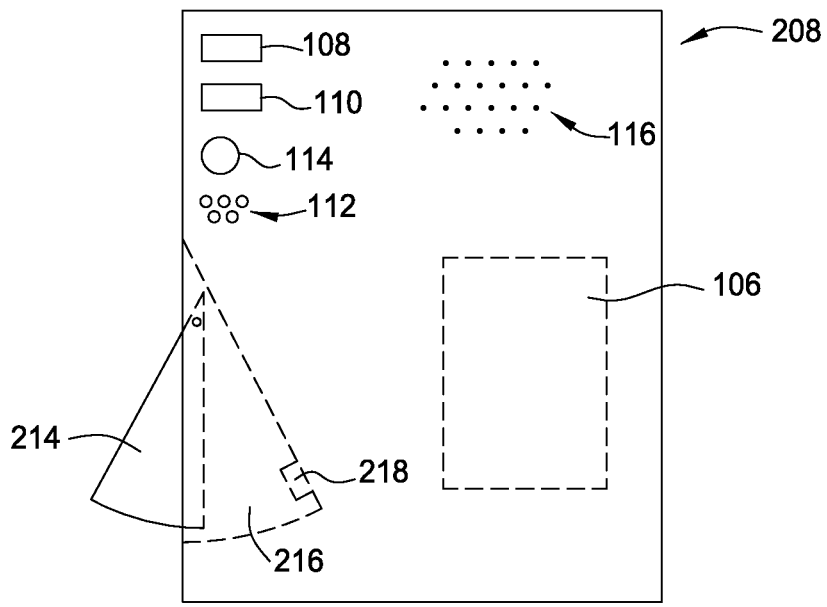
FIG. 2B is a schematic diagram of the apparatus shown in FIG. 2A
Figure 2C:
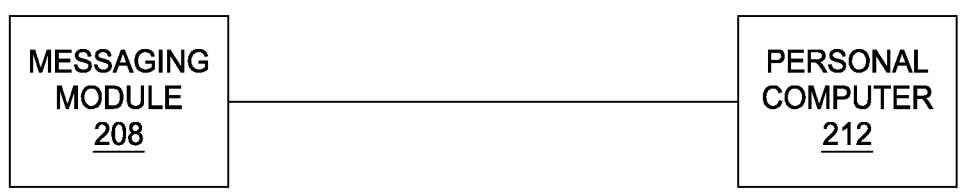
FIG. 2C is a schematic diagram of the apparatus of FIG. 2A in direct communication with the office occupant's computer.
Figure 2D:
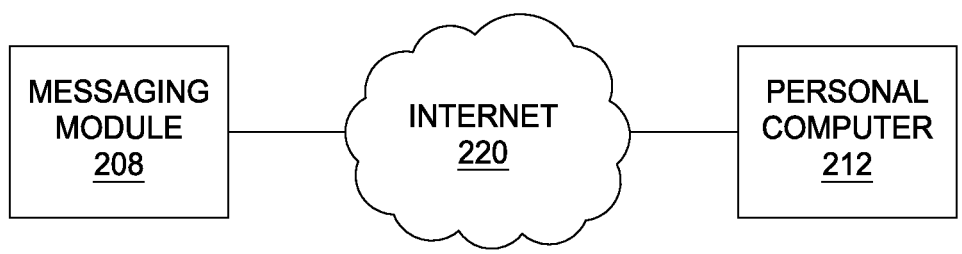
FIG. 2D is a schematic diagram of the apparatus of FIG. 2A in communication with the office occupant's computer via an Internet connection.

FIGS. 2A-2D and 6 illustrate an embodiment of a system designed for use in an office setting wherein the user 214 has an office 200 with a door 210. The system includes a messaging module 208 that can attach to a door frame 204. Referring to FIG. 2B, the messaging module 208 can include similar components as the headphones 100 discussed above with respect to FIGS. 1A-1C. For example, the messaging module 208 can include LEDs 108 and 110, a camera 114, a microphone 112, a processor module 106 and an external speaker 116. The messaging module 208 can also include a rocker 214 that can extend from the messaging module 208. When the door 210 is closed, the door 210 can push the rocker 214 into a recess 216 in which the rocker 214 can depress a switch or button 218. When the door 210 is closed (and the button 218 is depressed), the messaging module 208 can monitor for a person 602 approaching the user's door 210 and try to discourage the person 602 from disturbing the user 214. As described above, the messaging module 208 can record a message from the person 602 for later playback by the user 214. Referring to FIG. 2C, the messaging module may be directly connected to the user's 214 computer 212 via a wired connection or a wireless connection (e.g., a BLUETOOTH® wireless connection) such that messages can be transmitted to the computer 212. Referring to FIG. 2D, the messaging module 208 may communicate with the user's 214 computer 212 via the Internet 220. For example, in certain embodiments, the messaging module 208 may transmit recorded messages to the user's computer 212 as an attachment to an electronic mail message. As a result, the user 214 can review the recorded messages while at his desk 206.

Figure 3:
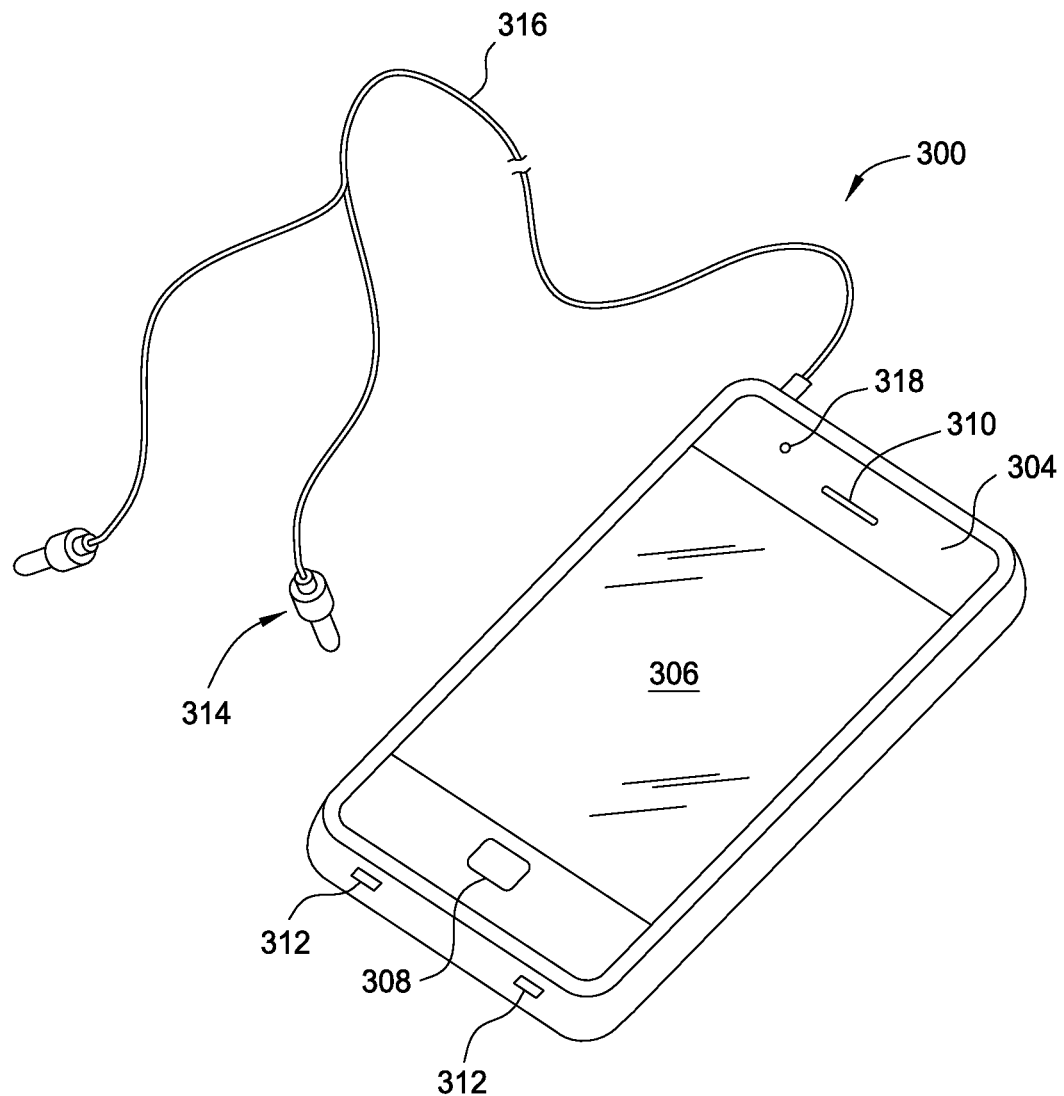
FIG. 3 is a perspective view of a smart phone with connected ear buds, wherein an embodiment of a system for discouraging an approaching person from interrupting a wearer of the ear buds and for enabling the approaching person to leave a message for the wearer is implemented in software on the smart phone.

Referring now to FIG. 3, embodiments of the system can be implemented in software, e.g., in an application that can run on a smart phone. For example, FIG. 3 illustrates a smart phone 300 connected to ear buds 314 by cables 316. A user may listen to content (e.g., music, movies, podcasts, and audio books) from the smart phone 300 via the ear buds 314. The application may use a camera 318 and microphones 312 built into the smart phone 300 to detect persons that may be approaching a user. Similar to the embodiments described above, when a person is detected approaching the user, the smart phone 300 can provide an audio message via a speaker 310 to alert the approaching person to not disturb the user. In addition, the smart phone 300 may be able to provide a visual cue to the approaching person on a view screen 306 if the phone is positioned where approaching people can see the screen 306. For example, the text "DO NOT DISTURB" may be flashed on the screen 306 when someone approaches the user.

Figure 7:
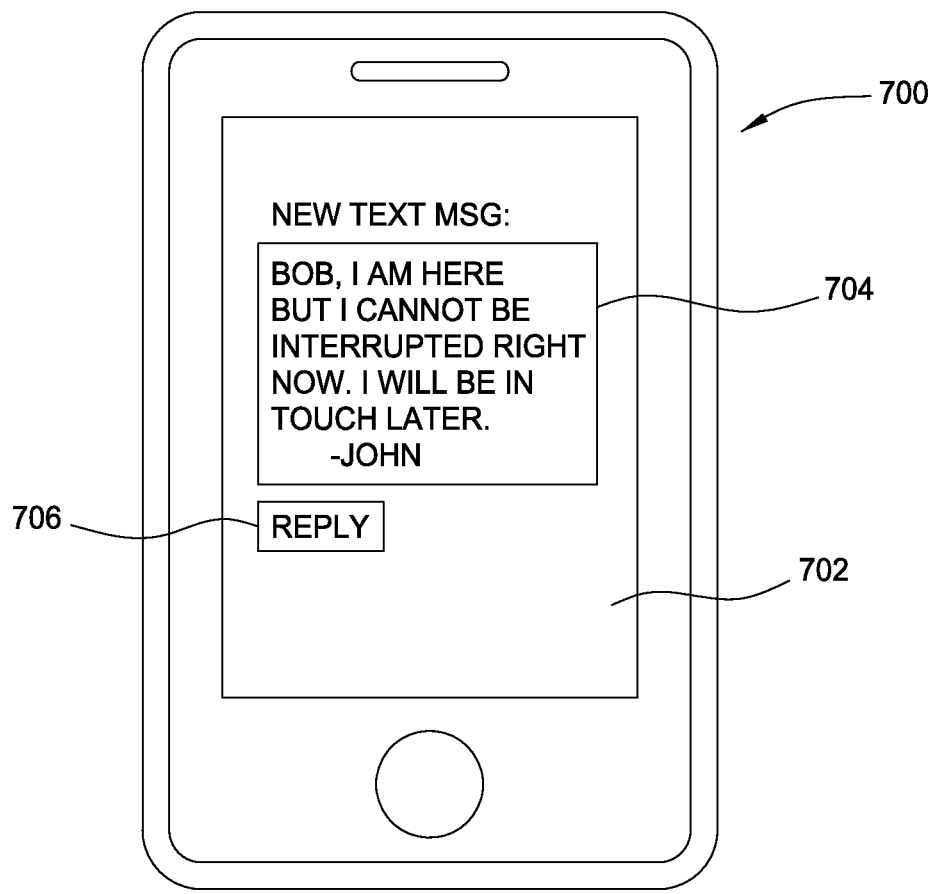
FIG. 7 illustrates an embodiment of a text message sent by the system in FIG. 3 to an approaching person's mobile smart phone.

In various embodiments, the system shown in FIG. 3 can work in conjunction with other smart phone applications to detect approaching acquaintances of the user. For example, the APPLE IPHONE® smart phone can run an application called "Find My Friends" that can track the location of acquaintances running the same application on their own phones. The "Find My Friends" tracking application may communicate with a server via a data connection (e.g., WiFi connection or cellular data connection). The server can receive reported locations of all phones running the tracking application. The server may only transmit a particular user's phone the reported locations of phones belonging to people who have agreed to be tracked user. For example, the tracking application may require both the user and another person to consent to each other being able to track the location of the other through the application. As a result, the server may only provide location information for phones of acquaintances. Embodiments of the system can monitor the reported locations of acquaintances (e.g., using tracking applications, such as the "Find My Friends" application) and send alerts to the smart phones of approaching acquaintances who would likely disturb the user. For example, a user may be studying in a coffee shop and using an embodiment of the system on his smart phone. A friend of the user also has a smart phone, and both the user's smart phone and the friend's phone are running a tracking application like "Find My Friends." If the friend is entering the coffee shop, the tracking application running on the user's smart phone can note the approach of the friend's smart phone. The system, monitoring the information from the tracking application, can determine that the friend is close enough to see the user and will likely want to interrupt (and thereby disturb) the user to say "hello." In these circumstances, the application may automatically send a text message to the friend's smart phone, informing the friend of the user's desire to not be disturbed. Referring to FIG. 7, the user's smart phone 300 can send a text message 704 to the friend's smart phone 700. The message may be personalized to the friend detected to be approaching. For example, if the user's name is Bob and the friend's name is John, then the text message 704 can read "Bob, I am here but I cannot be interrupted right now. I will be in touch later.—John." The friend may reply 706 to the text message. In certain embodiments, the user's smart phone 300 may withhold the responsive text message from the friend until the user exits from the "do-not-disturb" mode.

Figure 4:
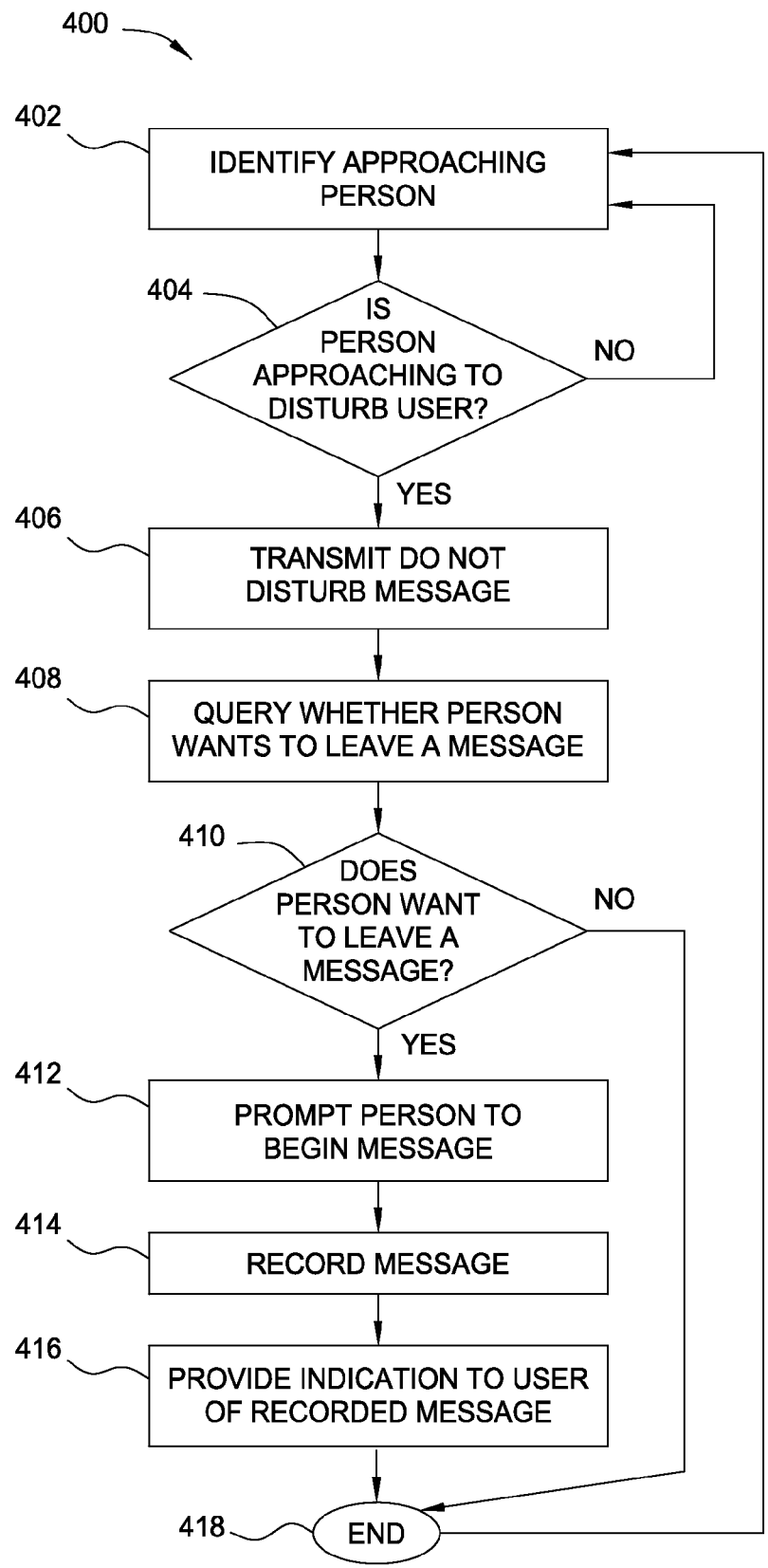
FIG. 4 is an embodiment of a flowchart for discouraging an approaching person from interrupting a user and for enabling the approaching person to leave a message for the user.
Figure 5:
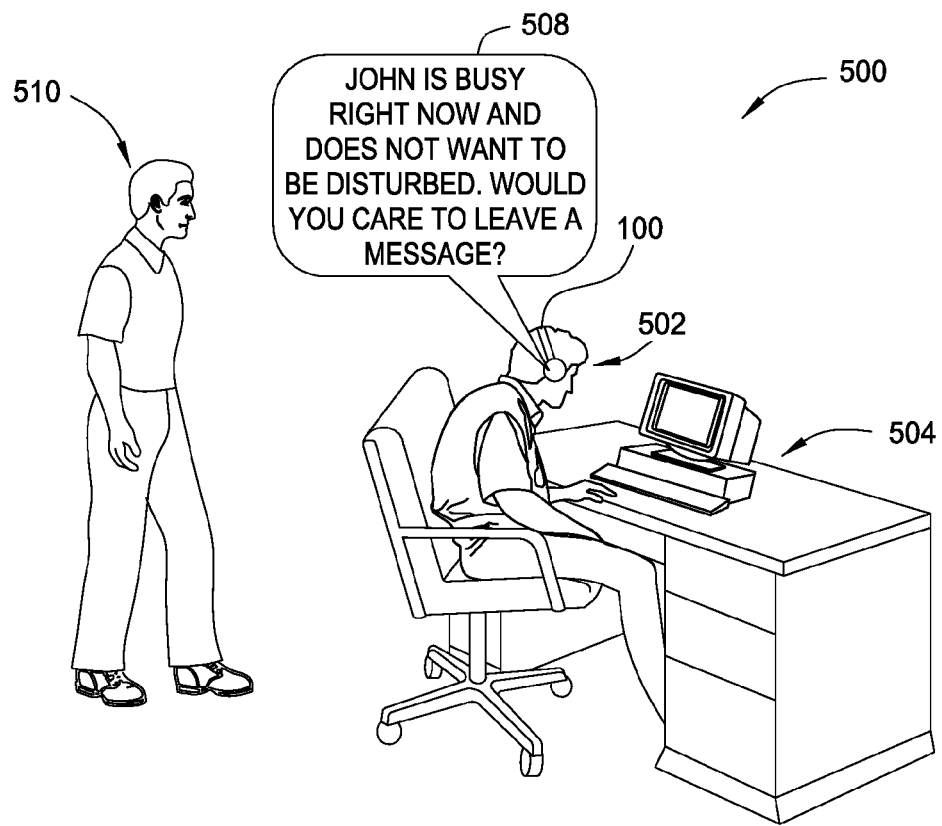
FIG. 5 is an illustration of the headphones of FIG. 1 discouraging an approaching person from interrupting a wearer of the headphones.
Figure 6:
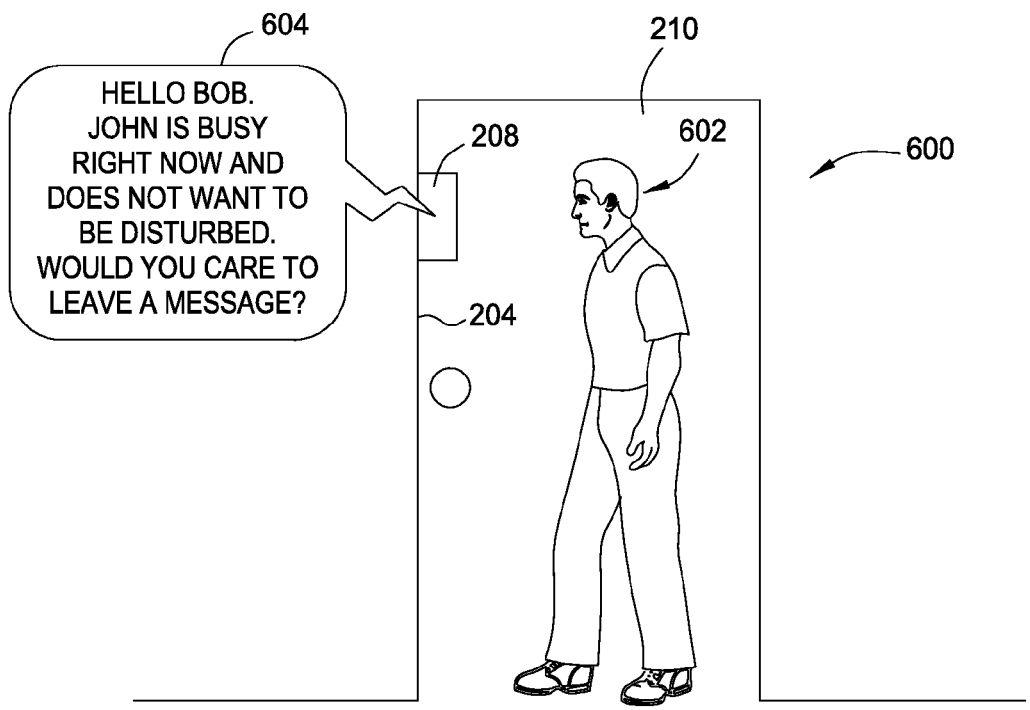
FIG. 6 illustrates the apparatus of FIG. 2A discouraging an approaching person from interrupting an office occupant.

Referring now to FIG. 4, steps for implementing a do-not-disturb system 400 are shown. In block 402, a system detects an approaching person. As described above, in certain embodiments, a system can use a camera and/or a microphone to detect an approaching person. In other embodiments, the system can use an electronic device, such as the person's smart phone (and a smart phone application, such as Apple's "Find My Friends" application) to detect his approach. In block 404, the system determines whether the approaching person is approaching to engage (i.e., disturb) the user. As described above, embodiments of the system can determine the direction of the approaching person's movement and/or eye gaze to determine whether the person is approaching the user. In certain embodiments, the system can use speech or voice recognition to determine if an approaching person intends to disturb the user. For example, if the system recognizes the voice of the approaching person as an acquaintance of the user, then the system can assume that the person is approaching to engage and thereby disturb the user. As another example, embodiments of the system may detect key words or phrases that indicate that the approaching person is trying to interact with the user. For example, the approaching person may say "Hey John." If the user's name is "John," then the system can recognize that the approaching person intends to engage the user.

If the system determines that the approaching person is approaching to engage the user, in block 406, the system can transmit a "do-not-disturb" message. For example, embodiments of a system can include a light, such as an LED 108, that illuminates red to indicate that the user does not want to be disturbed. In certain embodiments, the light may flash to attract the attention of the approaching person. In various embodiments, the system can emit an audible alert and/or message to the approaching person that the user of the system does not want to be disturbed. For example, the system could play (via an external speaker) a message that states "John does not wish to be disturbed right now" through an external speaker. In certain embodiments in which the system can display images on an external view screen (e.g., screen 306 on the user's smart phone), the system can display a message on the screen to indicate the user's "do-not-disturb" status. For example, the screen could simply display the phrase "DO NOT DISTURB" on the screen to inform approaching people to not interrupt the user.

After the approaching person has been notified that the user does not want to be disturbed, in block 408, the system can query whether the approaching person wants to leave a message. For example, using an external speaker, the system could ask "Do you want to leave a message?" In block 410, the system can determine if the approaching person wants to leave a message. For example, embodiments of the system can use an external microphone to listen for the approaching person to say "yes" or "no." In certain embodiments, the system can infer that the person does not want to leave a message if a camera of the system detects the person moving away from the user without providing an audible "no" response. If the system determines that the person does not want to leave a message, then the process can end (block 418) and/or return to the beginning at block 402. If the approaching person indicates that he wants to leave a message (e.g., answering "yes" in response to the query at block 410), then in block 412, embodiments of the system can provide a prompt for the person to leave the message. For example, the system may emit a beep sound to indicate the start of the recording to the person. The system may also emit an instruction such as "leave your message after the beep" and then emit the beep sound. In block 414, the system records the person's message. Embodiments of the system can record an audio recording (e.g., an MP3 file) of the person's message. Embodiments of the system may also record a video image of the person recording the message. Embodiments of the system can translate the person's speech into text and store the message in text form. In block 416, after the person's message has been recorded, the system can provide an indication to the user that a message awaits him. For example, in certain embodiments, a light can be illuminated on a housing of the system. In other embodiments, the message can be forwarded to an e-mail address such that the user is notified of the message by receiving the e-mail. After the indication has been provided, then the process ends at block 418.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer readable medium, for example, that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access other processing modules or new relevant events or continuous sounds (e.g., events or sounds added by other audio process modules) or related data available in the cloud.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A system for providing messaging services, comprising:
   a detector comprising an imaging sensor and configured to:
      detect a direction of eye gaze of a person approaching the system, and
      transmit a signal indicating the person approaching the system when the direction of eye gaze of the person is oriented toward the imaging sensor;
   an indicator communicatively coupled to the detector and configured to, without receiving manual user input after the detector transmits the signal indicating the person approaching the system, output an indication that the system is in a do-not-disturb mode and to prompt the person approaching the system to leave a message;
   an input device configured to receive a message from the person approaching the system; and
   a memory device configured to store the message.

2. The system of claim 1, wherein the detector further comprises logic configured to analyze images captured by the imaging sensor to detect the eye gaze direction of the person approaching the system.

3. The system of claim 2, wherein the imaging sensor is further configured to detect a direction of movement of the person approaching the system, and wherein the indicator is configured to output the indication that the system is in the do-not-disturb mode only when the person approaching the system is moving toward the imaging sensor.

4. The system of claim 1, wherein the detector further comprises a microphone and acoustic analyzer.

5. The system of claim 4, wherein the detector is configured to recognize voices, and wherein the indicator is configured to only output the indication that the system is in the do-not-disturb mode when the detector recognizes a voice of the person approaching the system.

6. The system of claim 1, wherein the indicator comprises an audio speaker, and wherein the indication comprises an audible do-not-disturb message and a prompt to leave a message.

7. The system of claim 1, further comprising a second indicator comprising a light source, wherein the light source is configured to illuminate when the message is stored in the memory device.

8. Audio headphones for isolating a subject wearer from sounds, comprising:
   a wearable housing;
   acoustic transducers arranged in the housing and configured to generate sound waves in the ears of the subject wearer;
   a first detector configured to detect a person approaching the audio headphones, wherein the first detector comprises an imaging sensor;
   an indicator configured to, without receiving manual user input after the first detector transmits a signal indicating the person approaching the audio headphones, output a do-not-disturb indication and to prompt the person approaching the audio headphones to leave a message;
   a second detector configured to receive a message from the person approaching the audio headphones; and
   a memory to store the message from the person approaching the audio headphones.

9. The audio headphones of claim 8, wherein the housing is arranged to fit over a head of a user in manner that places the acoustic transducers proximate the ears of the subject wearer.

10. The audio headphones of claim 8, wherein the imaging sensor is configured to detect a direction of eye gaze of the person approaching the audio headphones, and wherein the first indicator is configured to only output the do-not-disturb indication when the direction of the detected eye gaze is oriented toward the imaging sensor.

11. The audio headphones of claim 8, wherein the imaging sensor is configured to detect a direction of movement of the person approaching the audio headphones, and wherein the first indicator is configured to only inform the person approaching the audio headphones that the subject person does not want to be disturbed when the person approaching the audio headphones is moving toward the headphones.

12. The audio headphones of claim 8, wherein the second detector comprises a microphone.

13. The audio headphones of claim 8, further comprising a light source arranged in the housing, wherein the light source is illuminated when a message is recorded on the memory.

14. Audio headphones for isolating a subject wearer from sounds, comprising:
   a wearable housing;

acoustic transducers arranged in the housing and configured to generate sound waves in the ears of the subject wearer;

a first detector configured to detect a person approaching the audio headphones;

an indicator configured to, without receiving manual user input after the first detector transmits a signal indicating the person approaching the audio headphones, output a do-not-disturb indication and to prompt the person approaching the audio headphones to leave a message;

a second detector configured to receive a message from the person approaching the audio headphones; and a memory to store the message from the person approaching the audio headphones, wherein the first detector, the second detector, the indicator and the memory device are arranged in the housing.

15. Audio headphones for isolating a subject wearer from sounds, comprising:

a wearable housing;

acoustic transducers arranged in the housing and configured to generate sound waves in the ears of the subject wearer;

a first detector configured to detect a person approaching the audio headphones;

an indicator configured to, without receiving manual user input after the first detector transmits a signal indicating the person approaching the audio headphones, output a do-not-disturb indication and to prompt the person approaching the audio headphones to leave a message, wherein the indicator comprises an externally-facing speaker arranged in the housing, and wherein the do-not-disturb indication comprises an audio message transmitted over the externally-facing speaker to the person approaching the audio headphones;

a second detector configured to receive a message from the person approaching the audio headphones; and a memory to store the message from the person approaching the audio headphones.

16. A non-transitory computer-readable medium containing computer program code that, when executed by a processor, configures the processor to provide messaging services by performing the steps of:

detecting a direction of movement of a person by receiving an indication from a tracking program that tracks a position of a mobile device associated with the person;

detecting that the direction of movement of the person is toward a subject person;

in response to the detecting, transmitting a signal indicating that the person is approaching the subject person;

without receiving manual user input after transmitting the signal, providing an indication of a do-not-disturb mode to the person conveying that the subject person does not want to be disturbed and prompting the person to leave a message;

during the do-not-disturb mode, recording a message from the person; and outputting an indication that the message has been recorded.

* * * * *